United States Patent [19]
Bede

[11] 3,991,487
[45] Nov. 16, 1976

[54] FLIGHT TRAINING ASSEMBLY

[76] Inventor: James R. Bede, c/o Bede Aircraft, Inc., P.O. Box 706, Newton, Kans. 67114

[22] Filed: Feb. 3, 1976

[21] Appl. No.: 654,984

Related U.S. Application Data

[63] Continuation of Ser. No. 506,117, Sept. 16, 1974, abandoned.

[52] U.S. Cl. .............................. 35/12 R; 35/12 P; 272/1 C
[51] Int. Cl.² .............................................. G09B 9/08
[58] Field of Search ................ 35/12 R, 12 B, 12 E, 35/12 K, 12 L, 12 P, 12 W, 12 S, 11 A; 272/1 C, 31 A, 41; 114/66.5

[56] References Cited
UNITED STATES PATENTS

| | | | |
|---|---|---|---|
| 1,910,655 | 5/1933 | Traver | 272/1 C |
| 1,912,174 | 5/1933 | Bisch | 272/41 |
| 1,927,938 | 9/1933 | Huffman | 272/1 C |
| 2,362,190 | 11/1944 | Cortes | 272/36 |
| 3,304,549 | 2/1967 | Aiken | 40/52 R X |
| 3,818,613 | 6/1974 | Julian et al | 35/12 K |

FOREIGN PATENTS OR APPLICATIONS 443,998  2/1968  Switzerland ........................ 272/1 C

*Primary Examiner*—Richard C. Pinkham
*Assistant Examiner*—Vance Y. Hum
*Attorney, Agent, or Firm*—Meyer, Tilberry & Body

[57] ABSTRACT

A flight training assembly is disclosed comprising an airplane having pilot operable flight controls, a truck for propelling the airplane at a speed sufficient to achieve lift of the airplane, and a boom structure interconnecting the airplane and truck. One end of the boom is interconnected with the truck for pivotal movement relative thereto about horizontal and vertical axes, and the other end of the boom is interconnected with the airplane at the center of gravity thereof by means of a spherical bearing assembly. Pivotal movements of the airplane relative to the boom and of the boom relative to the truck are limited.

19 Claims, 7 Drawing Figures

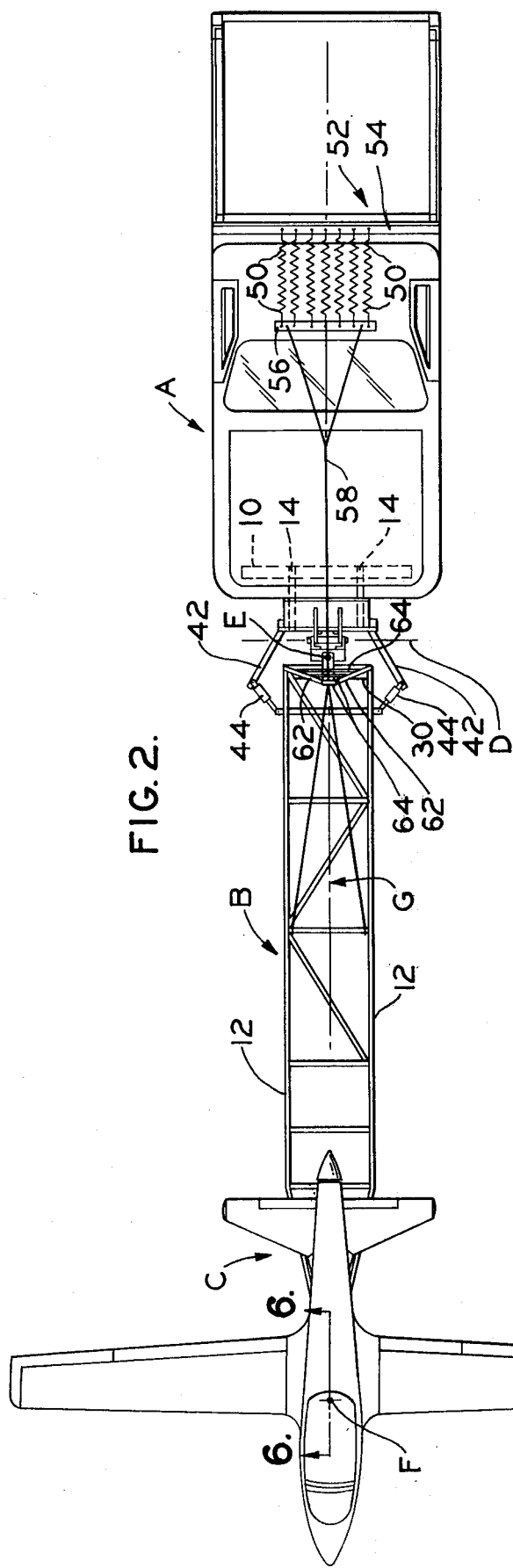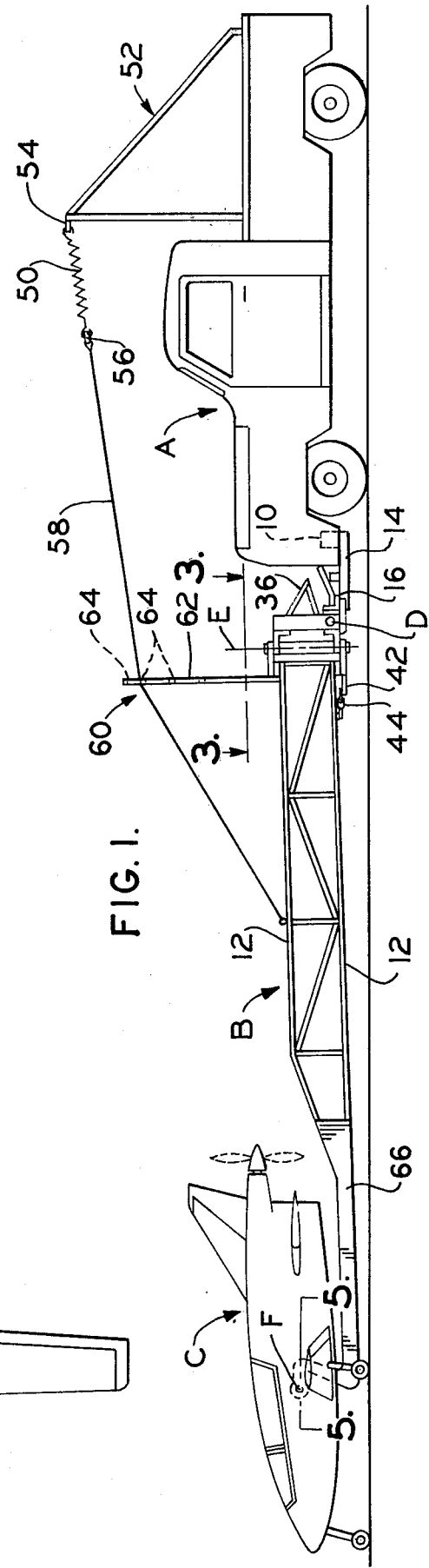

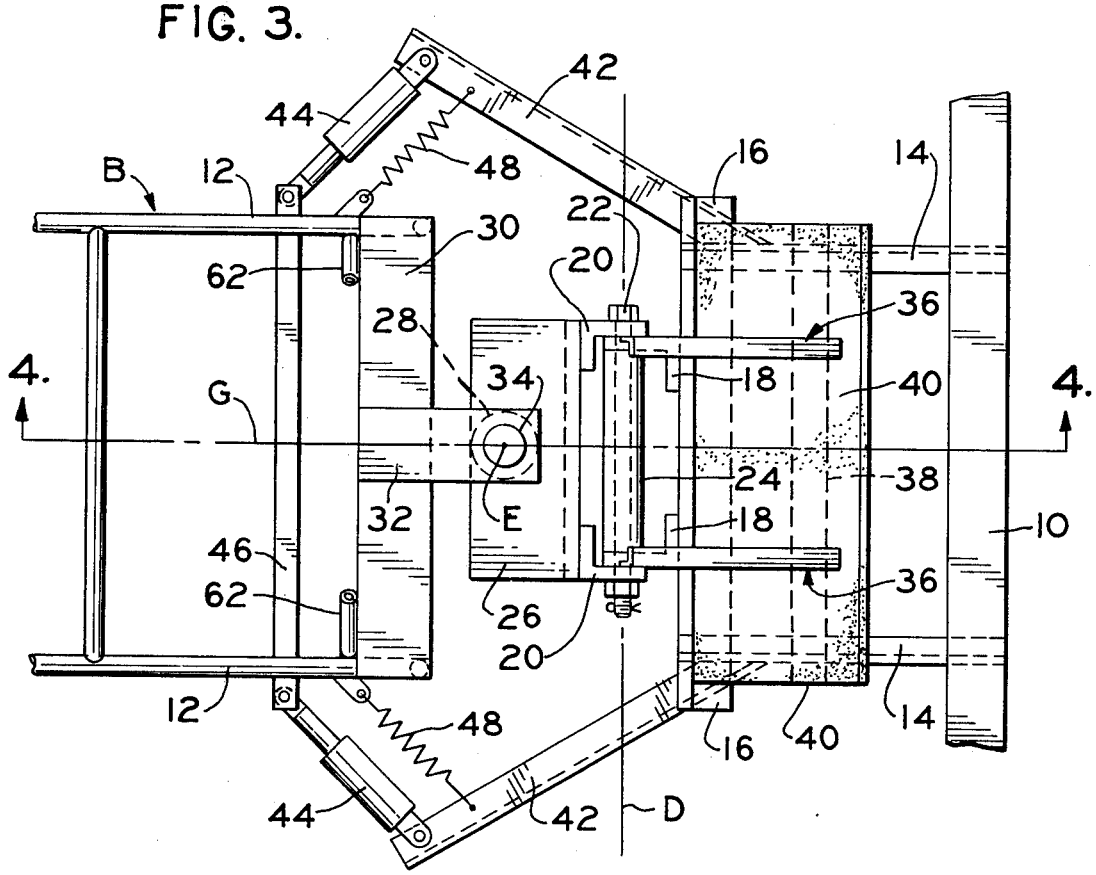
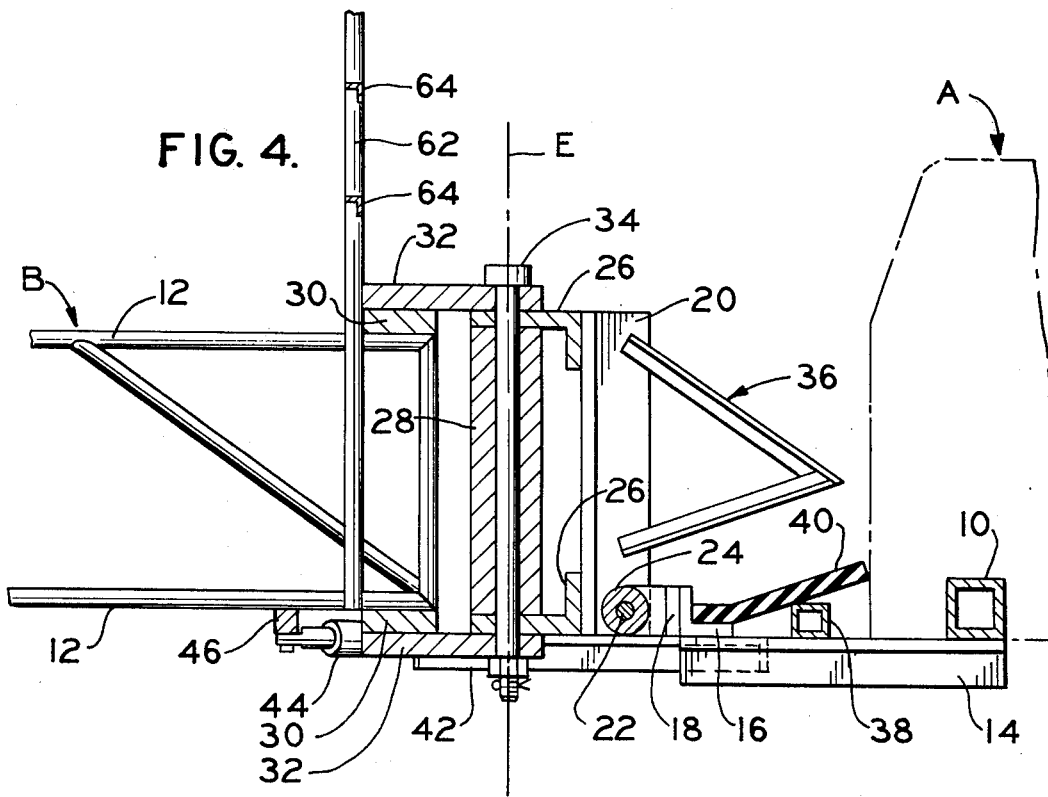

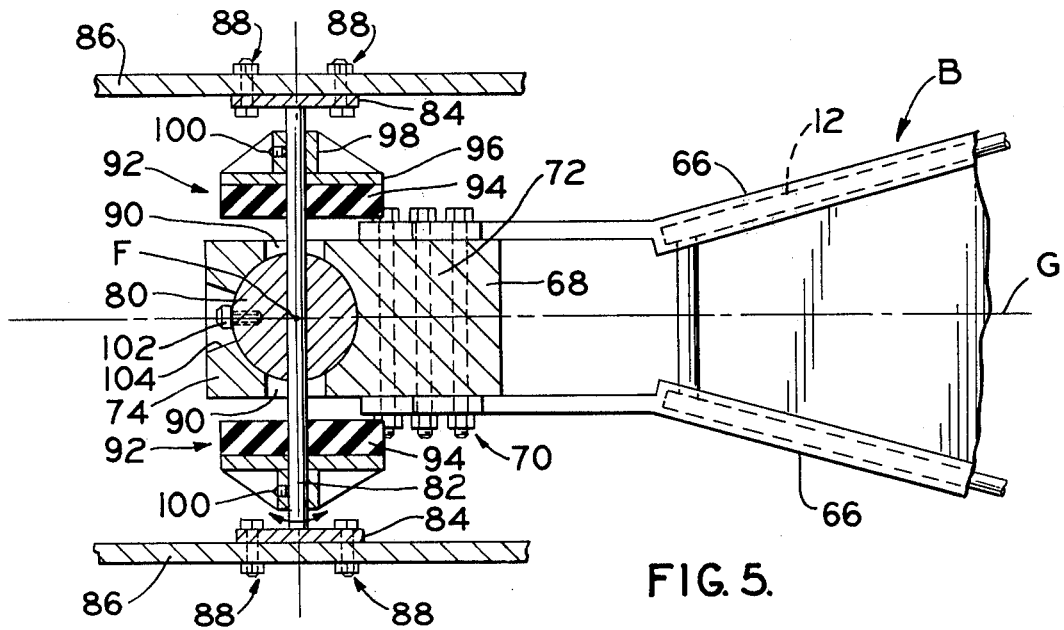
FIG. 5.
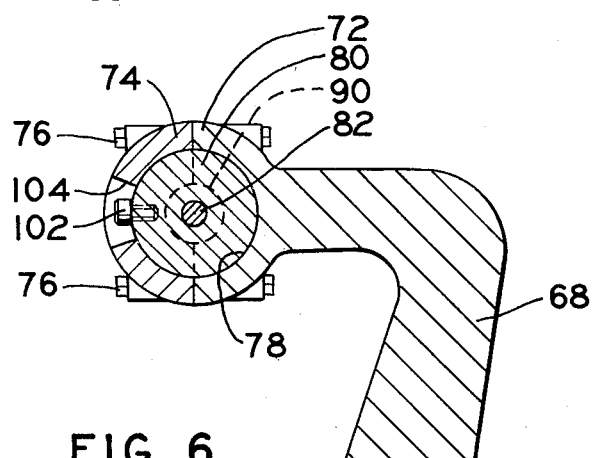
FIG. 6.
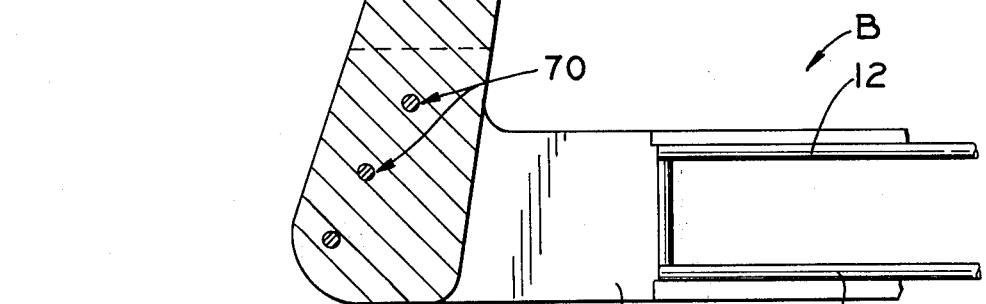
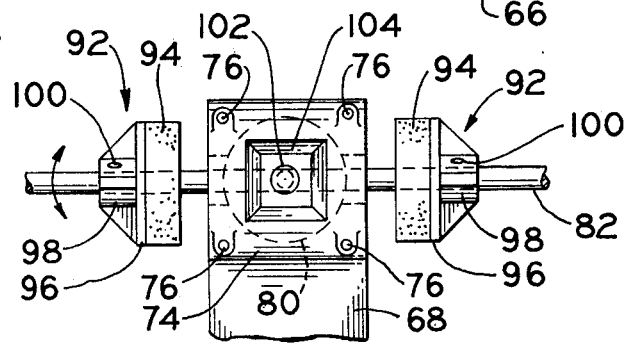
FIG. 7.

FLIGHT TRAINING ASSEMBLY

This is a continuation, of application Ser. No. 506,117 filed Sept. 16, 1974, now abandoned.

This invention relates to the art of educational devices and, more particularly, to airplane flight training aids.

The present invention finds particular utility in teaching a student pilot the techniques of taking-off and landing winged aircraft. Take-offs and landings are probably the most critical maneuvers in connection with flying, and proper judgment and coordination on the part of the pilot is required to minimize the likelihood of an accident during take-off and landing maneuvers. There are, of course, aircraft that are used primarily for training student pilots, and these trainers do teach the student all of the basic information required to pilot an airplane. However, due to the cost of operation only the minimum required time is devoted to the many maneuvers to be learned, including take-offs and landings. While it is recognized that more training in the techniques of taking-off and landing an airplane would be desirable, the cost of merely taking-off, circling the field and landing is prohibitive. Moreover, very little of the total time required to take-off, circle and land can be devoted to take-off and landing skills.

Another disadvantage in student training methods heretofore employed is that flying, and especially take-offs and landings, are restricted to good weather conditions. Accordingly, the student pilot is not likely to have any appreciable exposure during his training to adverse conditions such as a strong cross wind. If such conditions exist at an airport, traffic is directed to the runway most favoring the direction of wind. Still further, the student pilot is not exposed to the effect of changing the center of gravity of a plane, such as by passenger and/or baggage loading. It is difficult, but possible, to put a payload on an aircraft which causes the center of gravity to shift beyond a specific boundary relative to the center of gravity when the aircraft is not loaded. Pilots are trained to be aware of this possibility, but very few have any idea of the consequence of such a shift in the center of gravity and the effects thereof on control of the aircraft.

In addition to actual in-flight training, there are of course electronic flight simulators that have been developed primarily for military and commercial airline use. These simulators are extremely expensive and, moreover, only simulate various effects on an aircraft. Accordingly, the student pilot is still aware that he is not actually flying, whereby the capabilities of such simulators is limited.

In accordance with the present invention, a training assembly is provided which overcomes the disadvantages referred to hereinabove, and others, and provides training capabilities heretofore unattainable in connection with pilot training techniques. The training assembly of the present invention is comprised of a winged aircraft having pilot operable flight controls, a ground supported vehicle for propelling the aircraft at a speed sufficient to achieve lift thereof, and a boom interconnecting the vehicle and aircraft. The boom has one end interconnected with the vehicle for pivotal movement about horizontal and vertical axes, and the other end of the boom is interconnected with the aircraft at the center of gravity thereof such that the aircraft is universally pivotal relative to the boom.

Preferably, the ground supported vehicle is a truck or the like positioned behind the aircraft, whereby the aircraft is pushed in the direction of flight thereof. In use, a person such as a student pilot sits in the cockpit of the aircraft, and the truck driver accelerates the truck to a speed sufficient to achieve lift of the aircraft. The student pilot operates the flight controls so as to achieve a take-off during acceleration of the truck and landing during deceleration thereof. The training assembly can be used on an airport runway or the like and, depending on the length thereof, the student pilot can also manipulate the flight controls in the aircraft to perform other maneuvers while the aircraft remains airborne. In this respect, the universal joint connection between the aircraft and boom allows the student pilot to exercise pitch, roll or banking, and yaw movements of the aircraft. Pivotal movement of the boom relative to the truck about the vertical pivot axis enables the student pilot to achieve movement of the plane laterally with respect to the path of movement of the truck, and pivotal movement of the boom about the horizontal axis allows the student pilot to maneuver in elevation.

Preferably, pitch movement of the boom upwardly relative to the truck about the horizontal pivotal axis is limited as is yaw movement of the boom laterally of the truck about the vertical pivot axis. Likewise, it is preferred to provide limits with regard to the pitch, roll and yaw movements of the aircraft relative to the boom. Such limits avoid the possibility of the student pilot maneuvering the aircraft so as to cause damage thereto or to the boom and truck, and to avoid movement of the aircraft into a position which might cause lateral tilting of the drive vehicle or instability in the control thereof.

In accordance with another aspect of the present invention, pivotal movement of the aircraft relative to the boom can be limited so that certain flight maneuvers are locked out with respect to student pilot actuation of the flight controls. Accordingly, movement of the aircraft can be restricted, for example, to pitching movements until the student pilot gains experience with regard to controlling such movements. After the student becomes proficient in this control mode, the aircraft can be permitted to roll or bank and then, eventually, to yaw. Therefore, the student pilot gains experience with regard to the maneuvers one at a time. It is obvious that this provides a training capability which is impossible to achieve in flight training in a self-propelled aircraft.

In accordance with another aspect of the invention, the beam is biased to pivot upwardly relative to the truck about the horizontal pivot axis. This in effect reduces the weight of the aircraft on the forward end of the boom, whereby the aircraft can be made to fly at relatively low speeds. The ability to fly at low speed can be further increased by removing the power plant from the aircraft to reduce the weight thereof. The power plant is not employed during flight training and, accordingly, is preferably removed. The location of the universal joint is then at the center of gravity of the aircraft without the power plant.

The training assembly of the present invention also enables a student pilot to practice taxiing operations and lateral movement of the aircraft along the ground during taxiing. It will be appreciated too that the cost of operating the training assembly is considerably less than the cost of flying a plane and that, in a given period of operation, training time is maximized. Moreover, maneuvers including taking-off and landing can be practiced safely, and training under undesirable weather and load conditions can be achieved to give the student pilot experience with regard to the feel of such conditions. In this respect, for example, the training assembly can be operated on a runway where a strong cross wind condition exists, thus to enable the student to become proficient in maneuvering the aircraft under such conditions. As another example, weight can be added to the aircraft to reduce the stability thereof in the pitch direction, whereby the student pilot can experience the loss of stability under such conditions. Other destabilizing effects can also be introduced into the aircraft to expose the student pilot to flying conditions that could never be experienced on a normal training aircraft because of the danger that would exist. Under all of these normal and abnormal conditions, the student pilot can control maneuvering of the aircraft and, without exposure to dangerous circumstances, experience the feeling of actually flying the aircraft.

Accordingly, it is an outstanding object of the present invention to provide a flight training assembly including a pilotable winged aircraft attached to a ground supported drive vehicle and in which the aircraft is maneuverable relative to the ground and to the drive vehicle.

Another object is the provision of a flight training device of the foregoing character which enables a trainee to experience in-flight maneuvering of the aircraft under conditions of maximum safety.

Still another object is the provision of a flight training assembly of the foregoing character which enables a trainee to take-off and land the aircraft and to maneuver the aircraft in pitch, roll and yaw directions between a take-off and landing.

A further object is the provision of a flight training assembly of the foregoing character which enables a trainee to experience maneuverability of the aircraft under adverse weather and/or load conditions.

Still a further object is the provision of a flight training assembly of the foregoing character in which movement of the aircraft by the trainee is constrained within predetermined limits to avoid movement of the aircraft into an undesirable attitude relative to the ground and/or the drive vehicle.

Another object is the provision of a flight training assembly of the foregoing character which is economical to construct and operate and which maximizes the useful training time during a given period of operation.

The foregoing objects, and others, will in part be obvious and in part pointed out more fully hereinafter in conjunction with the description of a preferred embodiment of the invention illustrated in the accompanying drawings in which:

FIG. 1 is a side elevation view of a flight training assembly constructed in accordance with the present invention;

FIG. 2 is a plan view of the assembly illustrated in FIG. 1;

FIG. 3 is an enlarged plan view showing the joint structure between the boom and truck of the assembly;

FIG. 4 is a sectional elevation view of the joint assembly taken along line 4—4 in FIG. 3;

FIG. 5 is a plan view in section of the universal joint between the boom and aircraft taken along line 5—5 in FIG. 1;

FIG. 6 is a sectional elevation view of the universal joint taken along line 6—6 in FIG. 2; and, FIG. 7 is a front elevation view of the universal joint.

Referring now in greater detail to the drawings wherein the showings are for the purpose of illustrating a preferred embodiment of the invention only and not for the purpose of limiting the invention, the flight training assembly, as seen in FIGS. 1 and 2, is comprised of a ground supported vehicle A, a boom B, and a winged aircraft C. As described more fully hereinafter, boom B is mounted on the front of vehicle A for pivotal movement about a horizontal axis D and a vertical axis E, and aircraft C is mounted on the outer end of a boom B for universal pivotal movement of the aircraft relative to the boom about the center of gravity F of the aircraft.

In the embodiment shown, vehicle A is a pick-up type truck which, as is well known, includes an under carriage or frame. Such a frame includes or may be provided with a cross member 10 to support the corresponding end of boom B. It will be appreciated that the truck has driver controlled steering and speed control mechanisms, not illustrated. Any suitable boom structure can be employed and, as shown, the preferred structure includes elongated metal tubes or rods 12 which are spaced apart and interconnected by tubular cross members welded thereto to provide a rigid, open and light weight boom structure.

Any suitable structure can be employed for mounting the boom on the front end of the truck for pivotal movement about horizontal and vertical axes. In the embodiment disclosed, as best seen in FIGS. 3 and 4, the mounting structure includes a pair of angle iron members 14 having inner ends secured to vehicle frame component 10 such as by welding and having outer ends spaced forwardly of the vehicle. An angle iron cross member 16 extends laterally between members 14 at the outer ends thereof and is welded thereto. A pair of support brackets 18 are welded to cross member 16, and a pair of vertical angle iron members 20 are pivotally interconnected at their lower ends with brackets 18 by means of a pivot pin component 22. Pin component 22 extends through aligned openings in brackets 18 and members 20 and through a sleeve 24 having its opposite ends welded to brackets 18.

A pair of L-shaped plate members 26 are welded to the upper and lower ends of vertical members 20 so that one of the legs of each of the plates 26 extends horizontally and forwardly from members 20. The latter legs are provided with vertically aligned openings therethrough, laterally centrally thereof, and a sleeve 28 is aligned with the openings through the legs and has its opposite ends welded to the legs. The corresponding end of boom B is provided with upper and lower cross plates 30 which are welded to the tubular members of the boom. Hinge arms 32 are welded to cross members 30 laterally centrally thereof and extend rearwardly therefrom into overlying relationship with the forwardly extending legs of members 26. Hing arms 32 are provided with openings aligned with the openings through members 26 and sleeve 28, and a pivot pin component 34 extends through the aligned openings as shown. It will be appreciated, therefore, that the axis of pivot pin 22 defines horizontal pivot axis D and the axis of pin 34 defines vertical pivot axis E.

Preferably, upward pitch movement of boom B about axis D is limited to control the extent to which the aircraft can be elevated relative to ground. For this purpose, upright members 20 are provided with stop members 36 which are welded thereto and extend rearwardly therefrom toward truck A. Further, a cross member 38 is welded to angle iron members 14 so as to be in the path of movement of stop members 36 in response to upward pitch movement of the boom. Preferably, a pad 40 of rubber or the like is provided between stop members 36 and cross member 38 to cushion the stopping movement of the boom when the desired limit of movement is reached.

It is also desirable to limit yaw movement of boom B in laterally opposite directions about axis E and relative to center line G of the truck. For this purpose, a pair of support arms 42 are welded to angle iron members 14 and 16 to extend laterally outwardly and forwardly thereof. The outer ends of arms 42 are interconnected with boom B by means of corresponding movement limiting and damping components 44 having opposite ends pivotally interconnected one with arm 42 and the other with a cross member 46 welded to the boom. The structure of devices 44 is not pertinent to the present invention, and any suitable device can be employed for limiting pivotal movement of boom B toward the corresponding arm 42 and, preferably, cushioning such movement. Pneumatic or hydraulic shock absorber type devices would be suitable for the intended purpose.

Further in accordance with the preferred embodiment, it is desirable to provide for boom B to be biased toward a center position with respect to center line G of the truck. As shown in FIG. 3, this is achieved by a tension spring 48 between each arm 42 and the corresponding side of boom B. Upon movement of boom B in either direction about axis E, one of the springs 48 is tensioned and thus tends to return the boom toward a position in alignment with center line G of the truck. It will be appreciated that many arrangements for achieving centering of the boom can be devised. For example, centering springs could be employed in conjunction with or as a component part of components 44.

With further regard to boom B, it is desirable to minimize the effective weight of the boom in order to reduce the effective load to be lifted by aircraft C during use of the assembly. In the embodiment shown, as best seen in FIGS. 1 and 2, the effective weight of the boom is reduced by means of a lift assisting arrangement including a plurality of spring components 50. Springs 50 have corresponding ends secured in a fixed position relative to truck A, and the opposite ends of the springs are interconnected with the boom and are displaceable relative to the fixed ends. More particularly, a suitable spring frame 52 is mounted on the truck in a fixed position relative thereto and includes a cross member 54 provided with a plurality of apertures to receive the ends of springs 50. The opposite ends of springs 50 are interengaged with apertures in a cross bar 56, and the latter cross bar is connected by a cable arrangement 58 with boom B at a location spaced forwardly of pivot axis D. Further, cable 58 is spaced above horizontal axis D by means of a support bridge 60 which, in the embodiment shown, includes a pair of legs 62 welded at their lower ends to boom B and interconnected by a plurality of cross members 64 which are vertically spaced apart from one another. Cable 58 extends across and rests on a given one of the cross members, and the forward ends of the cable are suitably attached to the boom. It will be appreciated that cable 58 is adapted to be associated with a selected one of the cross members 64, thus to vary the lifting effect of springs 50 on boom B. Any number of cross members can be provided for this purpose. Moreover, it will be appreciated that arrangements other than that shown can be employed to achieve a force to counteract the weight of the boom.

Any suitable winged aircraft can be employed in the training assembly of the present invention and, in the embodiment shown, the aircraft is a light weight, single seat plane of the pusher type having a power plant behind the cockpit and a propeller at the tail of the plane. In order to minimize the weight of the plane, the power plant is removed, whereby center of gravity F is the center of gravity for the plane without the power plant. Although not shown in detail, it will be appreciated that the plane includes pilot operable flight controls for operating wing, stabilizer and rudder flaps to achieve maneuvering of the plane in flight.

As mentioned hereinabove, the plane is mounted on the forward end of boom B by a universal joint assembly so that the plane is capable of pitch, roll and yaw movements relative to the boom. The structure of the forward end of the boom and a universal joint construction for the latter purpose is shown in FIGS. 5–7 of the drawing. In this respect, the forward end of the boom is provided with metal side plates 66 which are welded to boom tubes 12 and are laterally spaced apart to receive an inverted L-shaped metal arm 68 which is mounted between the plates such as by means of a plurality of nut and bolt assemblies 70. Arm 68 extends upwardly into the aircraft through a suitable opening in the bottom of the fuselage thereof. The free end of arm 68 extends forwardly and supports a spherical bearing block assembly comprised of bearing block members 72 and 74 which are interconnected by suitable nut and bolt assemblies 76. Bearing block member 72 can be integral with arm 68 or can be a separate component welded or otherwise mounted on the free end of arm 68.

The inner surfaces of bearing block members 72 and 74 are provided with recesses cooperatively defining a spherical cavity 78 which receives and pivotally supports a spherical bearing member 80. Bearing member 80 is apertured to receive a rod 82, and the bearing member is securely mounted on the rod in any suitable manner to prevent both rotational and axial displacement of the bearing member relative to the rod. The ends of rod 82 are welded to support plates 84 which in turn are mounted on frame components 86 of the aircraft on laterally opposite sides thereof. Preferably, the rod and plates are removably mounted on the frame components such as by nut and bolt assemblies 88.

Rod 82 extends horizontally in the direction between the opposite sides of aircraft C, and the axis of the rod passes through the center of gravity F of the aircraft. Further, spherical bearing member 80 is centrally located in the direction between the opposite sides of the aircraft, whereby the center of the spherical bearing member coincides with center of gravity F. The laterally opposite sides of bearing block members 72 and 74 are provided with openings 90 coaxial with rod 82 and of a diameter sufficiently large to permit the desired pivotal movement of bearing member 80 relative to the boom.

As mentioned hereinabove, pivotal movement of the aircraft in the pitch, roll and yaw directions relative to boom B is limited. In the embodiment shown, pivotal movement in the yaw and roll directions is limited by means of a pair of resilient pad assemblies 92 mounted on rod 82 on laterally opposite sides of bearing block members 72 and 74. Each pad assembly 92 includes a circular disc 94 of resilient material such as rubber suitably secured to a metal backup plate 96 which is integral with or attached to a hub 98. Rod 82 extends through the pad assembly, and the latter is axially slidable relative to the rod to adjust the distance between the pad assembly and the adjacent side of bearing block members 72 and 74. A set screw 100 or the like can be employed to lock the pad assembly in a desired position. It will be seen, therefore, that by spacing each pad assembly from the corresponding side of bearing block members 72 and 74, aircraft C can pivot relative to boom B in the yaw and roll directions to the extent determined by such spacing. When the aircraft approaches the desired extent of movement in these directions, resilient discs 94 engage the corresponding side of the bearing block assembly to cushion and stop the movement.

Movement of aircraft C in the pitch direction relative to boom B is limited, in the embodiments shown, by a stop pin 102 mounted on spherical bearing member 80 and a window or opening 104 provided in bearing block member 74. The axis of pin 102 is on a radial line through the center of spherical member 80, and the pin is threaded into a recess in member 80 so as to be removable therefrom. Window 104 is of square or rectangular contour and has a width in the direction between the sides of bearing block member 74 sufficient to permit the desired movement of aircraft C in the yaw direction relative to boom B. The head of pin 102, in the embodiment shown, is circular and the diameter thereof and the height of window 104 are designed to permit the desired extent of pitch movement of aircraft C in opposite directions relative to center of gravity F. When the nose of the aircraft is pitched downwardly pin 102 engages the lower edge of window 104 to stop the pitch movement, and when the nose of the aircraft is pitched upwardly pin 102 engages the top edge of window 104 to stop the latter pitch motion.

It will be appreciated from the foregoing description that pivotal movement of aircraft C relative to boom B can be limited to just pitch movements by positioning pad assemblies 92 in abutment with the opposite sides of bearing block members 72 and 74. This locks out roll and yaw movements and thus enables the student pilot to experience and become familiarized with control of the aircraft in the pitch direction only. When the student becomes proficient in this control mode, the pad assemblies can be moved outwardly from the bearing block members to release the aircraft for movement in the roll and yaw directions. If desired, circular pin 102 can be replaced by a pin having a width corresponding to the distance between the sides of window 104 and a height less than the distance between the top and bottom edges of the window. The side edges of the latter pin would be rounded at a radius of curvature corresponding to the distance between the axis of pin 102 and the side edges of window 104. This pin and window configuration would permit movement of the aircraft in the pitch and roll directions, but would preclude movement in the yaw direction. Rolling movement would be limited by pad assemblies 92 in the manner described hereinabove. Accordingly, the student pilot can now experience and become familiar with control of the aircraft in two modes of movement. After the student becomes proficient in these control modes, pin 102 can be again employed in conjunction with bearing member 80, whereby the student pilot is now able to experience control of the aircraft in all three modes of movement.

The extent to which aircraft C is permitted to pivot in the pitch, roll and yaw directions relative to boom B can of course be varied as can the extent to which boom B is permitted to pivot in the yaw and pitch directions relative to truck A. Preferably, the limits are such as to enable the student pilot to practice take-offs and landings and other maneuvers of the aircraft with the degree of freedom he would have in a normal aircraft flight, but within limits of aircraft movement which make it virtually impossible to cause any uncontrolled situation which might result in damage to the aircraft, boom or truck. It has been found that these desirable results can be achieved with the following movement limitations: aircraft pitch up 15° from horizontal and pitch down 10° relative to horizontal; aircraft roll 10° right and left and yaw 10° right and left; boom yaw 10° right or left of the center line of the truck and boom pitch upwardly approximately 25° relative to horizontal. In the embodiment herein illustrated and described, the truck is a commercially available truck, the boom is approximately 18 feet long, and the aircraft is a BD-5 single seat aircraft manufactured by Bede Aircraft, Inc. of Newton, Kansas. The movement limitations refer to maximum degrees of movement in connection with the preferred embodiment.

In use, the truck driver operates the truck to move the aircraft into a desired position on a practice runway. During such movement, the student pilot controls movement of the aircraft along the ground and thus gains experience in taxiing the aircraft. When in position on the runway, the driver accelerates the truck and, when the ground speed is sufficient, the student pilot operates the flight controls of the aircraft to achieve a take-off. Following the take-off the student pilot can exercise those controls of movement of the aircraft which have been made available to him. When the truck approaches the end of the runway the driver decelerates the truck and the student pilot operates the flight controls to land the aircraft. Of considerable advantage in use of the training assembly is the fact that a flight instructor can ride in the truck and communicate instructions to the student pilot through a communication system between the truck and aircraft.

While considerable emphasis has been placed herein on certain structural components of the preferred flight training assembly, it will be appreciated that many modifications can be made in the preferred embodiment without departing from the principles of the present invention. In this respect, for example, a ground supported drive vehicle other than a pickup truck could readily be employed to propell the aircraft, and the aircraft could be other than the particular plane herein identified. Moreover, any suitable boom structure can be employed, and many structural arrangements other than that herein shown can be devised to achieve the desired mounting of the boom on the drive vehicle for pivotal movement about horizontal and vertical axes. Likewise, many arrangements other than that herein illustrated and described can be devised and employed for achieving universal pivotal movement of the aircraft relative to the forward end of the boom, and many arrangements can be devised for achieving limited pivotal movement of the aircraft relative to the boom and of the boom relative to the drive vehicle. The arrangements herein illustrated and described in this respect are merely illustrative of operable arrangements for the intended purpose. Accordingly, as many embodiments of the present invention can be made and as many changes can be made in the embodiment herein illustrated and described, it is to be distinctly understood that the foregoing descriptive matter is to be interpreted merely as illustrative of the present invention and not as a limitation.

What is claimed is:

1. A flight training assembly comprising a winged aircraft having pilot operable flight controls, a ground supported vehicle behind said aircraft with respect to the direction of flight thereof, said vehicle being movable along the ground at a speed to achieve lift of said aircraft, boom means, means mounting said boom means on said vehicle for pivotal movement relative to said vehicle about a horizontal boom axis extending laterally of said vehicle and about a vertical boom axis, universal joint means pivotally interconnecting said aircraft with said boom means substantially at the center of gravity of said aircraft, said universal joint means supporting said aircraft for pivotal movement relative to said boom means about a first horizontal aircraft axis extending laterally of said aircraft, a second horizontal aircraft axis extending longitudinally of said aircraft and a vertical aircraft axis, and means limiting pivotal movement of said boom means relative to said vehicle and pivotal movement of said aircraft relative to said boom means.

2. The training assembly according to claim 1, wherein said means limiting pivotal movement of said boom means includes means to control the rate of pivotal movement of said boom means about said vertical boom axis.

3. The training assembly according to claim 2, and means biasing said boom means to pivot about said horizontal boom axis in the direction to assist lift of said aircraft relative to ground.

4. The training assembly according to claim 3, wherein said biasing means includes spring means.

5. The training assembly according to claim 1, wherein said universal joint means is spherical bearing means including a spherical bearing member and spherical bearing support means, a shaft supporting said spherical bearing member at the center of gravity of said aircraft, said spherical bearing support means being fixed on said boom means, and said means to limit pivotal movement of said aircraft including resilient pad means on said shaft and engaged by said bearing support means in response to pivotal movements of said aircraft relative to said boom means about said second horizontal aircraft axis and about said vertical aircraft axis.

6. The training assembly according to claim 5, wherein said means to limit pivotal movement of said aircraft further includes means to limit pivotal movements of said aircraft relative to said boom means about said first horizontal aircraft axis.

7. The training assembly according to claim 6, and means releaseably connecting said resilient pad means on said shaft for adjusting the position of said pad means toward and away from said bearing support means.

8. The training assembly according to claim 7, wherein said means limiting pivotal movement of said boom means relative to said vehicle includes means to control the rate of pivotal movement of said boom means about said vertical boom axis, and means biasing said boom means to pivot about said horizontal boom axis in the direction to assist lift of said aircraft relative to ground.

9. A flight training assembly comprising, a winged aircraft having pilot operable flight controls, a wheeled motor driven vehicle including frame means and having operator controlled steering and speed control means, a boom having a first end, means interconnecting said first boom end and said frame means for pivotal movement of said boom relative to said vehicle about a horizontal boom axis extending laterally of said vehicle and about a vertical boom axis, said boom extending forwardly from said vehicle and beneath said aircraft in the direction from the tail of said aircraft toward the nose thereof, said boom having a second end extending upwardly into said aircraft, means interconnecting said second end of said boom with said aircraft at the center of gravity of said aircraft and supporting said aircraft for universal pivotal movement relative to said boom about a first horizontal aircraft axis extending laterally of said aircraft, a second horizontal aircraft axis extending longitudinally of said aircraft and a vertical aircraft axis, means to limit said pivotal movement of said boom relative to said vehicle about said horizontal and vertical boom axes, and means to limit said universal pivotal movement of said aircraft relative to said boom about said first and second horizontal aircraft axes and about said vertical aircraft axis.

10. The training assembly according to claim 9, and further including spring means biasing said boom laterally about said vertical boom axis toward a central position with respect to the laterally opposite sides of said vehicle.

11. The training assembly according to claim 9, and means including spring means biasing said boom to pivot about said horizontal boom axis in the direction to assist lift of said aircraft relative to ground.

12. The training assembly according to claim 9, wherein said means to limit pivotal movement about said horizontal and vertical boom axes includes bumper means mounted on said front end of said frame means and arm means mounted on said boom and pivotal therewith about said horizontal boom axis, said bumper means and arm means being cooperatively positioned to limit upward movement of said aircraft relative to ground.

13. The training assembly according to claim 12, wherein said means to limit pivotal movement about said horizontal and vertical boom axes further includes motion damping devices on laterally opposite sides of said vertical boom axis, each of said devices having a first end interconnected with said frame means and a second end interconnected with said boom, and each of said motion damping devices being operable to damp and limit pivotal movement of said boom about said vertical boom axis.

14. The training assembly according to claim 13, and spring means on laterally opposite sides of said vertical boom axis biasing said boom about said vertical boom axis toward a laterally central position with respect to said vehicle.

15. The training assembly according to claim 14, and means biasing said boom to pivot about said horizontal boom axis in the direction to assist lift of said aircraft relative to ground.

16. The training assembly according to claim 9, wherein said means interconnecting said second end of said boom with said aircraft includes a horizontal shaft fixed to and extending across said aircraft and through said center of gravity, a spherical bearing member on said shaft at said center of gravity, and bearing block means fixed on said second end of said boom and supporting said spherical bearing member.

17. The training assembly according to claim 16, wherein said means to limit said universal pivotal movement of said aircraft includes resilient pad means positioned on said shaft to engage said bearing block means in response to pivotal movements of said aircraft relative to said boom about said second horizontal aircraft axis and about said vertical aircraft axis.

18. The training assembly according to claim 17, wherein said pad means is releaseably mounted on said shaft for adjustment toward and away from said bearing block means.

19. The training assembly according to claim 17, wherein said means to limit said universal pivotal movement of said aircraft further includes means to limit pivotal movements of said aircraft relative to said boom about said first horizontal aircraft axis.

* * * * *